United States Patent
Augenstein et al.

(12)
(10) Patent No.: US 6,443,283 B1
(45) Date of Patent: Sep. 3, 2002

(54) FLUID FRICTION CLUTCH OPERABLE WITH NON-MAGNETIC HOUSING OR DISK PARTS

(75) Inventors: Claus Augenstein, Leonberg; Ralf Maus, Korntal-Muenchingen, both of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/585,578

(22) Filed: Jun. 2, 2000

(30) Foreign Application Priority Data

Jun. 2, 1999 (DE) .......................................... 199 25 132

(51) Int. Cl.[7] .............................................. F16D 35/02
(52) U.S. Cl. ................................... 192/58.61; 192/58.8
(58) Field of Search ............................ 192/58.61, 58.8, 192/84.1

(56) References Cited

U.S. PATENT DOCUMENTS

| | | | |
|---|---|---|---|
| 4,056,178 A | * 11/1977 | Detty | 192/58.61 |
| 4,305,491 A | 12/1981 | Rohrer | |
| 4,346,794 A | 8/1982 | Smeltzer | |
| 4,556,138 A | * 12/1985 | Martin et al. | 192/58.61 |
| 4,633,994 A | * 1/1987 | Light | 192/58.61 |
| 4,987,986 A | * 1/1991 | Kennedy et al. | 192/58.61 |
| 5,152,383 A | 10/1992 | Boyer et al. | |
| 5,152,384 A | 10/1992 | Brown | |
| 5,511,643 A | 4/1996 | Brown | |
| 5,937,983 A | * 8/1999 | Martin et al. | 192/58.61 |
| 5,992,594 A | * 11/1999 | Herrle et al. | 192/58.61 |

FOREIGN PATENT DOCUMENTS

| | | |
|---|---|---|
| DE | 2718723 | 11/1977 |
| DE | 3109724 | 12/1981 |
| DE | 3243967 C2 | 5/1984 |
| DE | 19753725 A1 | 6/1999 |
| EP | 0935080 A1 | 3/1999 |

* cited by examiner

Primary Examiner—Saúl Rodríguez
(74) Attorney, Agent, or Firm—Crowell & Moring LLP

(57) ABSTRACT

Fluid friction clutch is disclosed of the type having a primary disk (2) fastened on a driving shaft (3) comprising magnetic material and a driven clutch housing (1) surrounding the primary disk and mounted with a hub (5) on the shaft (3), and with a working chamber (9) formed between primary disk and clutch housing, into which a shear fluid can enter from a reservoir chamber (11) according to the position of a valve plate (15) opening or closing a connecting opening (13) between reservoir chamber and working chamber and having an armature (16) lying in reach of the shaft (3), which can be shifted by magnetic force produced by a stationary electromagnetic coil (24) arranged on the driven end of the shaft (3), wherein the hub (5) of the clutch housing (1) facing the electromagnetic coil (24) is provided with an inserted first conducting ring (21) of magnetic material which is coupled magnetically at one end (22) with the electromagnetic coil (24) and at its other end facing the working chamber (9) adjoins a second conducting ring (19) of magnetic material which passes through the primary disk (2) and ends in an area in front of the armature (16) of the valve plate (15).

20 Claims, 3 Drawing Sheets

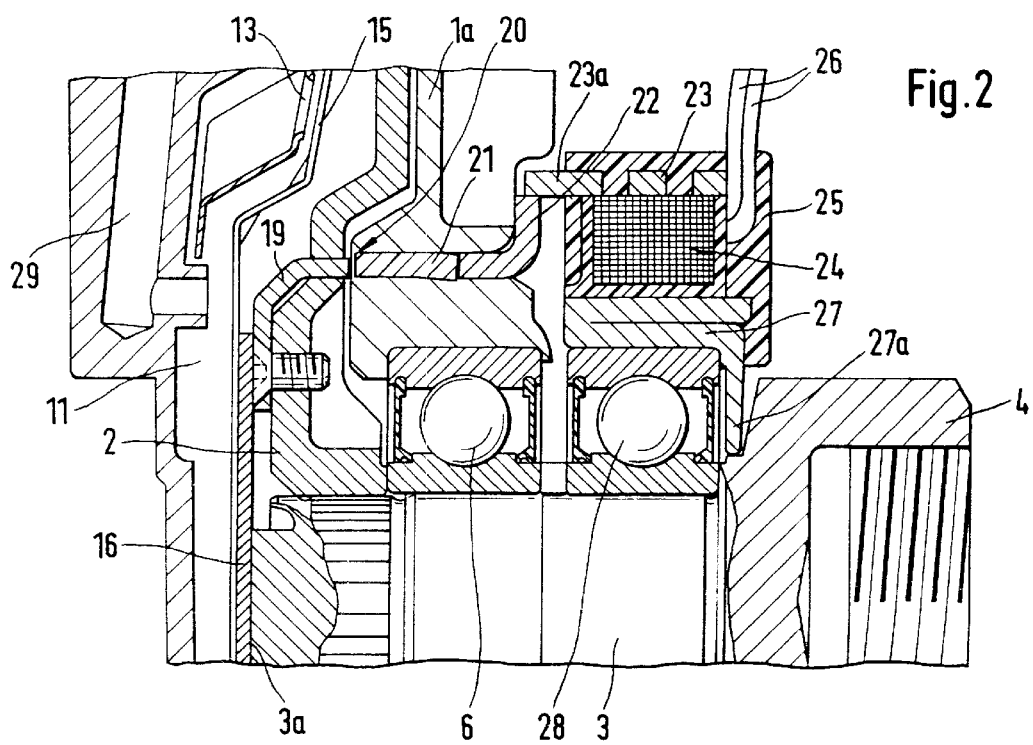
Fig.2
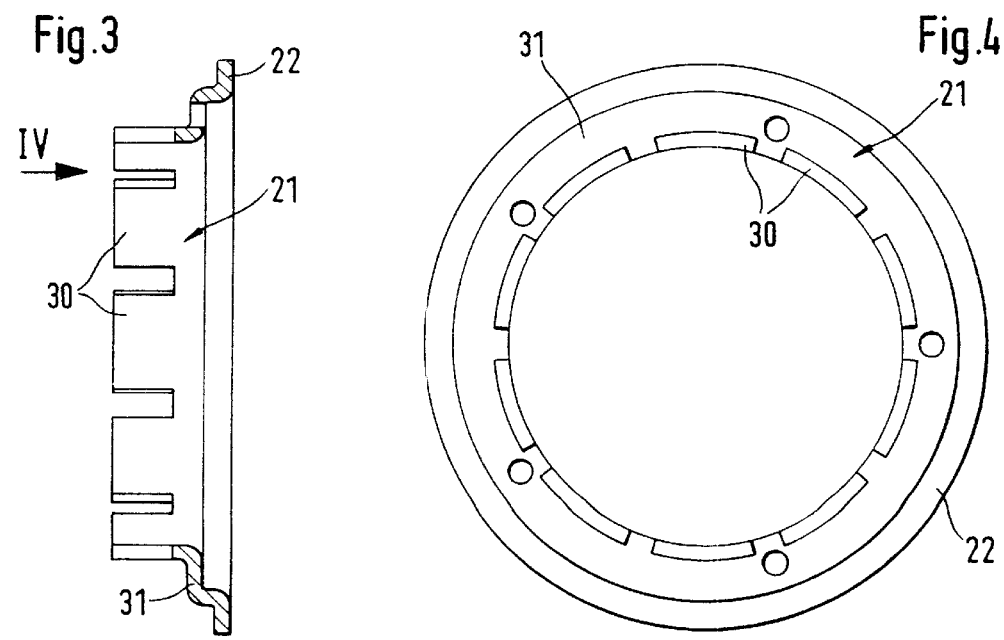
Fig.3
Fig.4

FLUID FRICTION CLUTCH OPERABLE WITH NON-MAGNETIC HOUSING OR DISK PARTS

BACKGROUND AND SUMMARY OF THE INVENTION

This application claims the priority of German Application No. 19925132.0, filed Jun. 2, 1999, the disclosure of which is expressly incorporated by reference herein.

The invention relates to a fluid friction clutch with a primary disk fastened on a driving shaft consisting of magnetically active material and a driven clutch housing surrounding the primary disk and journaled with a hub on the shaft, and with a working chamber formed between the primary disk and clutch housing into which a shear fluid can enter from a reservoir chamber according to the position of a valve plate which opens or closes a connecting opening between reservoir and working chamber and which has an armature lying in the vicinity of the shaft, which can be shifted against spring action by a magnetic force produced by a stationary electromagnetic coil arranged on the driven end of the shaft into the open or closed position.

Liquid friction clutches of this kind as known (DE 27 18 723 A1). In the known types the magnetic flux of the electromagnetic coil disposed on a fixedly held sleeve is transferred exclusively through the driven shaft to the armature of a valve plate disposed coaxially to the shaft. Since between the magnet coil and the armature to be actuated by its field the distance is great, the coil must be of correspondingly great dimensions if the use of such a design is to be possible in practice.

Liquid friction clutches of a similar kind have become known (DE 31 09 724 A1) in which an axially displaceable stem has been laid in the driven shaft, which with one end operates the valve plate and reaches at the other end into the range of an electromagnetic coil which is stationary and reaches into a cavity in the shaft. Such designs are quite complicated on account of the need to move the valve operating parts mechanically and, due to the danger of the seizing of the valve stem, tend to give trouble.

Other types of electromagnetically operated fluid friction clutches, such as those shown in U.S. Pat. No. 4,346,794, since the magnetic flux works through the driven shaft and the clutch housing, can be used only if the clutch housing consists of magnetic material.

The present invention is addressed to the problem of designing a fluid friction clutch of the kind described above such that the operation of the valve can be performed effectively with the least complication if the clutch housing and/or the primary disk do not consist of magnetic material.

In a fluid friction clutch of the kind mentioned above, this problem is solved in that the hub of the clutch housing facing the electromagnetic coil is provided with an inserted first conducting ring of magnetic material which is magnetically coupled with one end to the electromagnetic coil, and at its other end facing the working chamber adjoins with a gap a second conducting ring of magnetic material which passes through the primary disk and ends in an area in front of the armature of the valve plate.

On account of this configuration, since the driven shaft itself consists of magnetically conductive material, a closing of the magnetic lines of force is produced in a relatively simple manner, and suffices to operate the valve even if the electromagnetic coil itself is not oversized.

In a further advantageous feature of a preferred embodiment of the invention, both conducting rings can be configured in the manner of crowns with protruding points and can be embedded in the material of the clutch housing and primary disk, and especially cast therewith. This is advantageous especially when primary disk and clutch housing consist of aluminum.

In a further advantageous feature of a preferred embodiment of the invention, the first conducting ring can be with an outwardly facing flange at a short distance from a magnetic flux ring, and the second conducting ring can have on its side reaching into the working chamber an inwardly facing flange in contact with a radial wall of the primary disk; so that the magnetic flux can be guided directly by the electromagnetic coil into the area in front of the armature of the valve plate and back again from there through the shaft on which the electromagnetic coil is placed in a known manner likewise through a magnetically conductive ring.

An advantageous feature of a preferred embodiment of the invention the gap between the two conductive rings can be closed off tightly from the working chamber by a wall portion of the hub, so That the arrangement of the conductive rings will not cause the clutch housing to have leaks.

In a further advantageous feature of a preferred embodiment of the invention, the shaft can be provided at its and facing the working chamber with a projection which serves as a pole for the armature, and this projection can be provided with an end face which lies in one plane together with the inwardly directed margin of the second conductive ring. The second conducting ring and shaft therefore form a planar contact surface which is closed by an armature plate of the valve and in this manner provides such that the magnetic force can act especially well on the valve.

Other objects, advantages and novel features of the present invention will become apparent from the following detailed description of the invention when considered in conjunction with the accompanying drawings.

BRIEF DESCRIPTION OF THE DRAWINGS

The invention is represented in the drawing by an embodiment and is described herewith:

FIG. 2 shows an enlarged representation of a portion of the fluid friction clutch according to FIG. 1;

FIG. 3 shows a longitudinal section through the first of the two conducting rings used in the fluid friction clutch of FIGS. 1 and 2;

FIG. 4 shows a plan view of the conducting ring of FIG. 3 taken in the direction of the arrow IV;

DETAILED DESCRIPTION OF THE PREFERRED EMBODIMENT

Figure 1:
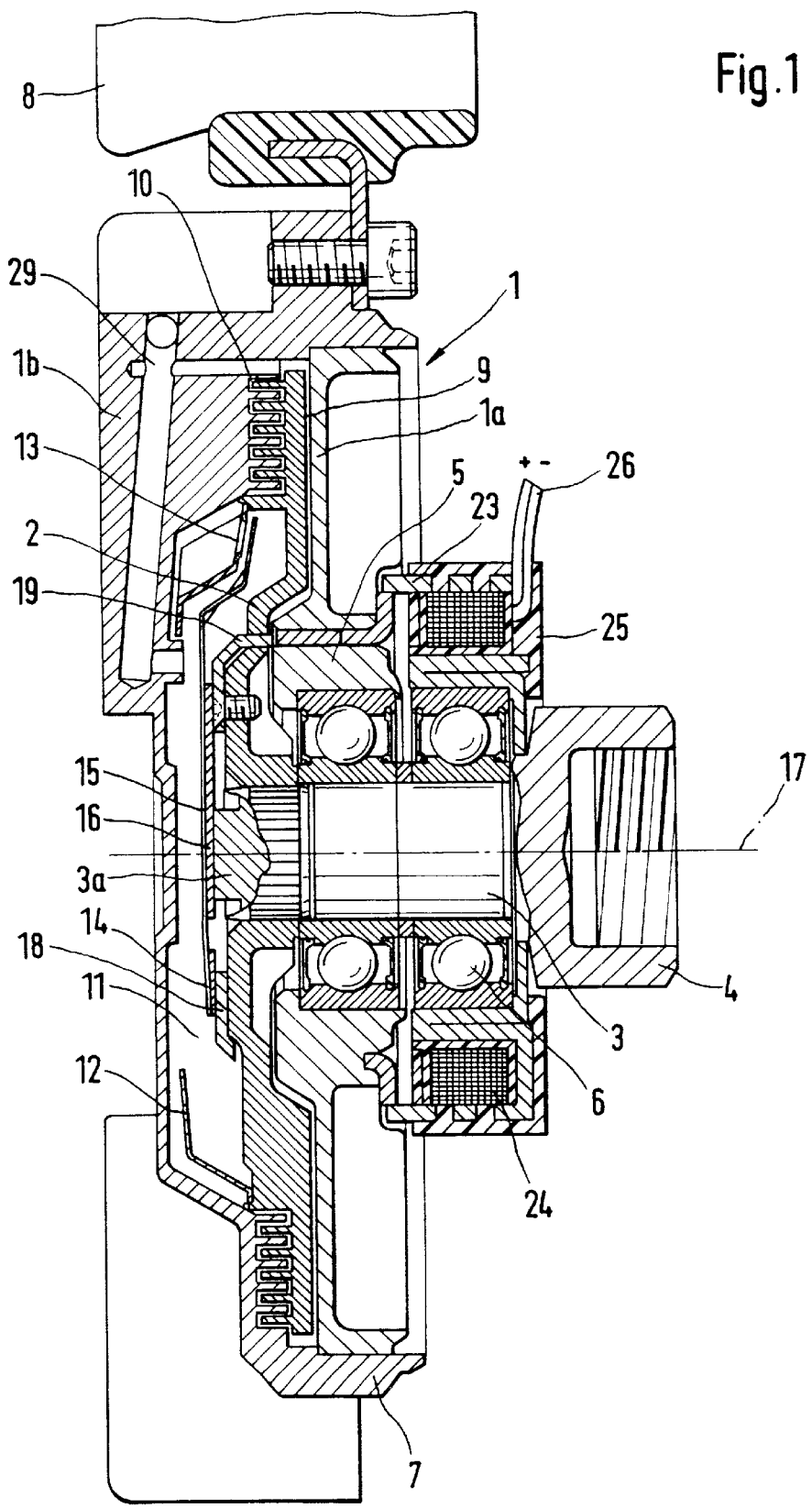
FIG. 1 shows a longitudinal section through a fluid friction clutch according to the invention.

FIG. 1 shows a fluid friction clutch with a clutch housing 1 for a driving primary disk 2 which is co-rotational with a driving shaft 3 having a connecting flange 4. The clutch housing 1 consists of two parts, namely an approximately disk-like base body 1a which is mounted with its hub 5 and a ball bearing 6 on the shaft 3, and a cover part 1b which is assembled with the base body 1a and which wraps externally around the base body 1a with a rim 7 where it is joined to the base body. The cover part 1b is provided externally with the vanes 8 of a fan, in a known manner. The fluid friction clutch 1 serves to drive this fan which, in a known manner, can be associated with the radiator of the motor vehicle engine.

Between the base body 1a and the cover part 1b a working chamber 9 is formed which has external annular gaps 10 running around it in a labyrinth-like manner and can be filled with a shear fluid which is taken from a reservoir chamber 11, which is likewise formed in the clutch housing 1 between cover part 1b and base body 1a, and which is separated from access to the annular gaps 10 by an annular coaxially circumferential separator 12. In this separator 12, which is connected with the primary disk 2, there is provided an opening 13 which can be closed by a valve lever 15 resiliently mounted at point 14, which in its central area, which also includes the area of the shaft 17, is connected to an armature plate 16 made of magnetic material.

In the position represented in FIG. 1 this armature plate 16 is drawn on the one hand against a projection 3a of the drive shaft 3 consisting of magnetic material, and on the other hand against an inwardly drawn margin 18 of a conducting ring 19 made of magnetic material, especially sheet steel, which is separated by a gap 20 (see FIG. 2) from a first conducting ring 21 also made of magnetic material, sheet steel for example. This conducting ring 21, hereinafter to be called the first conducting ring, has a circumferential outwardly turned flange-like margin 22 by which it is separated by a slight gap from a neck 23a of a ring 23. This ring 23 likewise consists of magnetic material, and it is associated with an electromagnetic coil 24 which is housed in an insulating body 25 and can be supplied with current through conductors 26. This electromagnetic coil is mounted by a mounting ring 27 of magnetic material on the outer ring of a ball bearing 28, and this mounting ring 27 reaches with an inwardly projecting collar 27a into the range of the flange 4 of the drive shaft 3. In the position represented, the electromagnetic coil 24 is energized, so that the magnetic lines of force run through the ring 23 to the first conducting ring 21, from there through the gap 20 to the second conducting ring 19 and through the armature plate 16 to the projection 3a and through the latter back through shaft 3 to the mounting ring 27.

In the position shown, the opening 13 in the separator 12 is open. If the power to coil 24 is cut off, the valve lever 15 closes the opening 13 by its inherent spring bias, so that the shear fluid in the working chamber 9 can pass through the return bore 29 only back to the reservoir chamber 11, but can no longer pass into the working chamber 9 and between the annular gaps 10. The clutch therefore is disengaged.

FIGS. 3 to 6 better illustrate the construction of the first conducting ring 21 and second conducting ring 19.

The first conducting ring 21, as shown in FIGS. 3 and 4, is made in the manner of a crown, and has a plurality of approximately rectangular points 30 which project to one side from a circumferential step 31 which merges with the flange-like ring 22. This first conducting ring 21 is integrated into the base body 1a when the latter is made. Since the base body, as part of the clutch housing, consists of aluminum, it is possible to cast the first conducting ring 21 together with it in the casting process, in which case, as FIG. 2 clearly shows, the gap 20 between the free ends of the points 30 and the adjoining second conducting ring 19 is made a part of a thin aluminum wall which provides such that the clutch housing remains sealed at this point from the working chamber.

Figure 5:
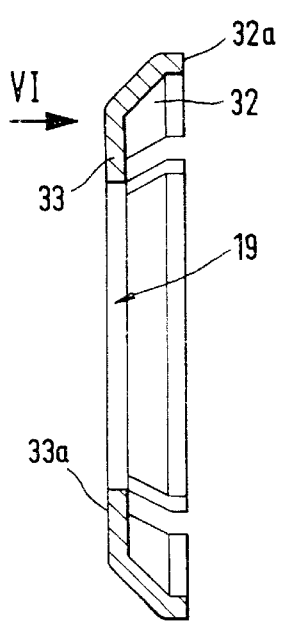
FIG. 5 shows a longitudinal section taken through the second of the two conducting rings of the fluid friction clutch of FIGS. 1 and 2.
Figure 6:
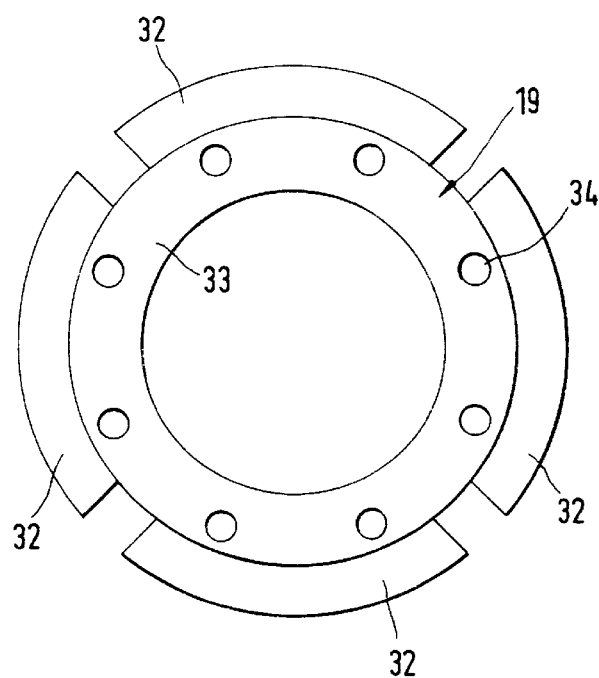
FIG. 6 shows a plan view of the conducting ring of FIG. 5 seen in the direction of the arrow 6.

The second conducting ring 19 is, as shown in FIGS. 5 and 6, also made in the manner of a crown, only here the four points 32 project outwardly from an inwardly turned rim 33 which is provided with openings 34 for fastening with screws to the hub of the primary disk 2. In the assembled state, therefore, the edges 32a of the points 32, as shown in FIGS. 1 and 2, are separated from the free edges of points 30 by only a narrow gap, a portion of this gap—see FIG. 2—being formed by an aluminum wall.

FIGS. 1 and 2 furthermore show that the outside 33a of the margin 33 lies in one plane with the face of the projection 3a of shaft 3, so that, as shown in FIGS. 1 and 2, the armature plate 16 of the valve lever 15 can lie fully against the poles formed by these parts when the electromagnetic coil 24 is supplied with electric power.

An embodiment according to the invention opens the simple possibility even in the case of primary disks and clutch housings of nonmagnetic material, of producing an effective flow of magnetic flux lines to an electromagnetic coil which, in a known manner, is held against rotation on one side of the housing of the fluid friction clutch. In the embodiment represented it can also serve ads a mounting for the driving shaft 3. By the arrangement of the two magnetic conducting rings it becomes possible to make the electromagnetically operated fluid friction clutch very compact, because the electromagnetic coil 24 can be brought quite close to the clutch housing 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fluid friction clutch, comprising:
a primary disk fastened on a driving shaft comprising magnetic material and a driven clutch housing surrounding the primary disk and mounted with a hub on the shaft, and with a working chamber formed between primary disk and clutch housing, into which a shear fluid can enter from a reservoir chamber according to the position of a valve plate opening or closing a connecting opening between reservoir chamber and working chamber and having an armature lying in reach of the shaft, which can be shifted by magnetic force produced by a stationary electromagnetic coil arranged on the driven end of the shaft, wherein the hub of the clutch housing facing the electromagnetic coil is provided with an inserted first conducting ring comprising magnetic material which is coupled magnetically at one end with the electromagnetic coil and at its other end facing the working chamber adjoins a second conducting ring comprising magnetic material which passes through the primary disk and ends in an area in front of the armature of the valve plate.

2. Fluid friction clutch according to claim 1, wherein both conducting rings are configured in the manner of crowns with projecting points and are embedded in the material of the clutch housing and primary disk, respectively.

3. Fluid friction clutch according to claim 1, wherein the clutch housing and the primary disk consist of aluminum.

4. Fluid friction clutch according to claim 1, wherein the first conducting ring stands with an outwardly directed flange at a slight distance from a flux ring projecting from the electromagnetic coil.

5. Fluid friction clutch according claim 1, wherein the second conducting ring has on its side reaching into the working chamber an inwardly directed flange portion lying against a radially disposed wall of the primary disk.

6. Fluid friction clutch according to claim 1, wherein a gap between the two conducting rings is partly formed by a wall portion of the hub so that the working chamber remains tightly closed.

7. Fluid friction clutch according to claim 1, wherein the shaft is provided at its end facing the working chamber with a projection which serves as a pole for the armature.

8. Fluid friction clutch according to claim 7, wherein the projection has an end face which lies in one plane together with the inwardly directed margin of the second conducting ring.

9. Fluid friction clutch according to claim 1, wherein the valve plate lies in a chamber forming the reservoir chamber and adjoining the primary disk, which is separated by an annular circumferential dividing wall from the connection to the working chamber.

10. Fluid friction clutch according to claim 8, wherein an opening provided in the dividing wall, which is closed or opened by the valve lever, produces the connection between the reservoir chamber and the annular chamber defined by the cover part and connected to the working chamber.

11. A fluid friction clutch, comprising:
a driving shaft comprising magnetic material,
a primary disk connected to the driving shaft and comprising a radial wall, wherein the primary disk does not consist of magnetic material,
a clutch housing comprising a cover part and an approximately disk-like base body with a hub, the clutch housing surrounds the primary disk and the base-body is mounted on the driving shaft at the hub, the clutch housing does not consist of magnetic material, the clutch housing defines an internal chamber comprising a working chamber and a reservoir chamber, the working chamber formed between the clutch housing and the primary disk such that shear fluid can enter from a reservoir chamber if a connecting opening, which provides a fluid connection between the working and reservoir chambers, is not closed,
an electromagnetic coil, arranged on the driving shaft, and
a first and a second conducting ring, wherein both the first and second conducting rings comprise magnetic material, the first conducting ring, provided within the hub of the base-body, magnetically couples with the electromagnetic coil and the adjoining second conducting ring, which passes through the primary disk,
whereby the electromagnetic coil is capable of opening a fluid connection between the reservoir chamber and the working chamber by magnetically shifting a valve lever against an armature and away from the connecting opening, thereby placing the fluid friction clutch in an engaging mode.

12. The fluid friction clutch of claim 11, wherein both the first conducting ring and the second conducting ring are configured as crowns, each with a plurality of projections, and the first conducting ring is at least partially embedded in the material of the hub of the base-body, and the second conducting ring is at least partially embedded in the material of the primary disk.

13. The fluid friction clutch of claim 11, wherein both the clutch housing and the primary disk comprise aluminum.

14. The fluid friction clutch of claim 11, further comprising a flux ring associated with the electromagnetic coil, the first conducting ring comprising an outwardly directed flange, which is adjacent to the flux ring.

15. The fluid friction clutch of claim 11, wherein the second conducting ring comprises an inwardly directed flange which abuts the radial wall of the primary disk.

16. The fluid friction clutch of claim 11, wherein the hub partially forms a gap between the first and second conducting rings.

17. The fluid friction clutch of claim 15, wherein the driving shaft comprises a driving shaft end which faces the working chamber, the driving shaft further comprising a projection from the driving shaft end which is magnetically connectable to the armature.

18. The fluid friction clutch of claim 17, wherein the projection has an end face which lies in one plane together with the inwardly directed flange of the second conducting ring.

19. The fluid friction clutch of claim 11, wherein an annular circumferential dividing wall separates the reservoir chamber from a fluid connection between the reservoir chamber and the working chamber, and wherein the valve lever adjoins the primary disk, the valve lever partially defining the reservoir chamber.

20. The fluid friction clutch of claim 19, wherein the connecting opening is formed within the dividing wall, and the connecting opening is closable by the valve lever.

* * * * *